United States Patent [19]

Mester et al.

[11] Patent Number: 4,931,885
[45] Date of Patent: Jun. 5, 1990

[54] METHOD OF CROSS-CHECKING DATA BLOCK IDENTIFICATION SIGNALS OF DATA REPRODUCED FROM A MAGNETIC TAPE RECORD

[75] Inventors: Roland Mester, Darmstadt; Rolf Loos, Eppertshausen; Jürgen Heitmann, Alsbach-Hähnlein; Jürgen Müller, Griesheim, all of Fed. Rep. of Germany

[73] Assignee: Robert Bosch GmbH, Stuttgart, Fed. Rep. of Germany

[21] Appl. No.: 198,135

[22] Filed: May 24, 1988

[30] Foreign Application Priority Data

Jun. 3, 1987 [DE] Fed. Rep. of Germany ....... 3718566

[51] Int. Cl.$^5$ .............................................. G11B 5/09
[52] U.S. Cl. .......................................... 360/48; 360/53
[58] Field of Search ............... 360/53, 47, 48; 371/67, 371/68

[56] References Cited

U.S. PATENT DOCUMENTS

| | | | |
|---|---|---|---|
| 3,787,815 | 1/1974 | Farr, Jr. | 371/67 |
| 4,016,599 | 4/1977 | Sherer | 360/53 |
| 4,415,938 | 11/1983 | Heitmann | 360/53 |
| 4,479,217 | 10/1984 | Philippides | 371/67 |
| 4,556,976 | 12/1985 | Howarth | 371/67 |

*Primary Examiner*—Vincent P. Canney
*Attorney, Agent, or Firm*—Frishauf, Holtz, Goodman & Woodward

[57] ABSTRACT

Data blocks recorded on oblique tracks on magnetic tape are preceded by synhronizing signals and block identification signals. The serial data identification signals are converted to 8-bit parallel form and then are split between an undelayed channel and a channel delayed by one data block. Under control of a sync detector the parallel data are made to correspond with data words and are then decoded for comparison of the block numbers. Since the block numbering is consecutive, the delayed decoded block number is incremented by one for comparison. When a positive comparison is obtained the block number of the delayed decoded signals is made available to identify the data block. A counter in a so called fly wheel circuit assures provision of a new block start signal if a synchronizing signal is missed and prevents the timing of the circuit from being put off by a false detection of a synchronizing signal. A block identification output appears only if its block number is in sequence.

9 Claims, 1 Drawing Sheet

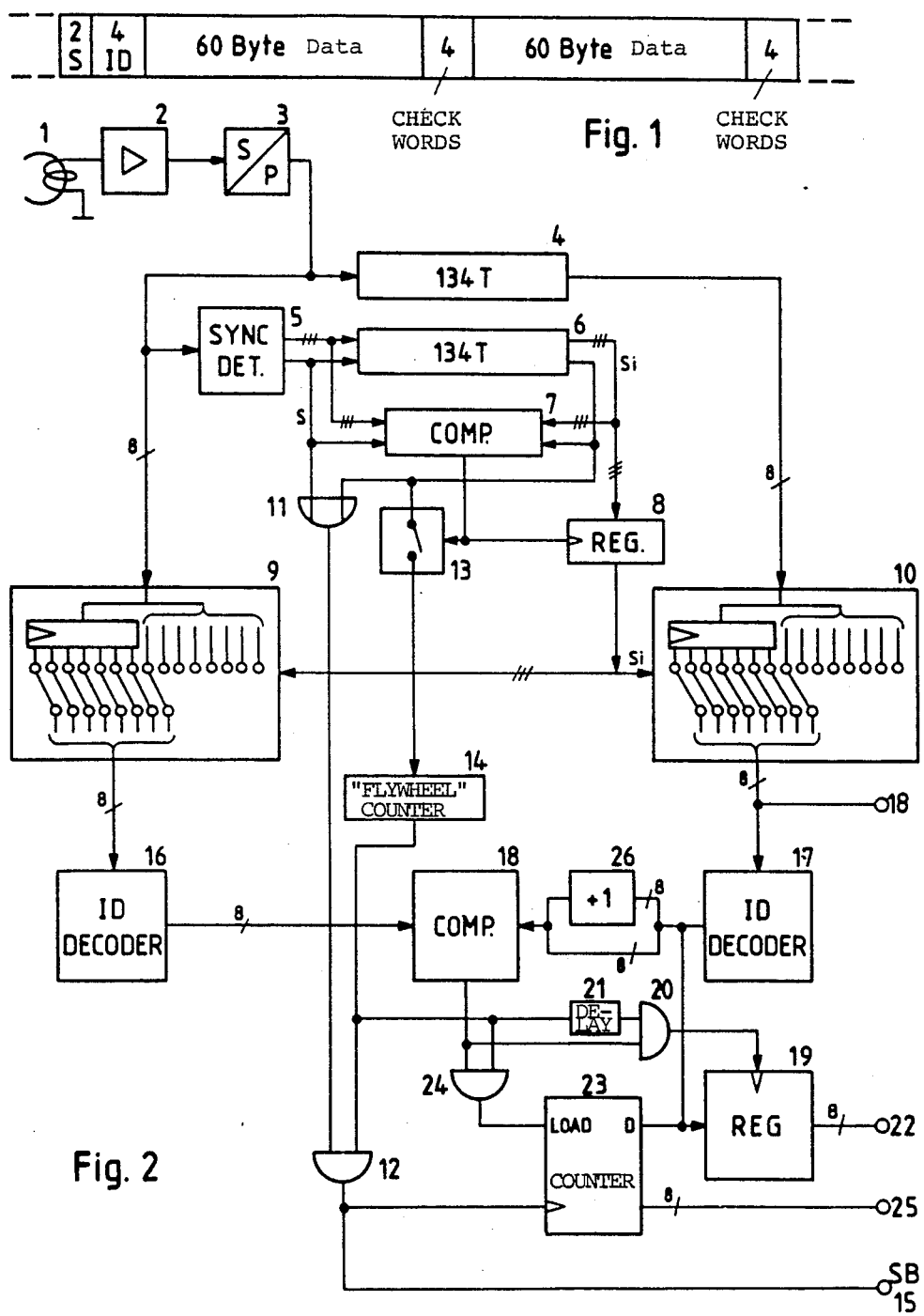

METHOD OF CROSS-CHECKING DATA BLOCK IDENTIFICATION SIGNALS OF DATA REPRODUCED FROM A MAGNETIC TAPE RECORD

CROSS REFERENCE TO PENDING APPLICATION ON RELATED SUBJECT MATTER

Application of Jurgen Heitmann, Rolf Loos and Roland Mester, Ser. No. 193,903, filed May 13, 1988 and claiming priority of German patent application No. P37 18 567.5, filed June 3, 1987.

This invention concerns reproduction of data recorded on magnetic tape in oblique tracks and read out by several magnetic heads mounted on the periphery of a head wheel, the data being subdivided into data blocks each preceded by synchronizing signals and block identification signals.

In the magnetic recording of digitally coded video signals, after sampling of the analog values, quantization and coding, with addition of identification and check signals, the data are recorded serially block by block. In the known magnetic tape recording and/or reproducing equipment, on account of the necessarily high overall transmission capacity, digitally coded video signals are recorded in four parallel channels each having correspondingly smaller transmission bandwidth. For recording or reproduction four magnetic heads are commonly used which are arranged on the periphery of a head wheel at uniform spacing around the wheel circumference. The envelopment angle of the tape over which the moving magnetic heads can be in contact with the tape is usually 258°.

Details of this known method are to be found in the published "Standard of Recording Digital Television Signals on Magnetic Tape and Cassettes" of the European Broadcasting Union (EBU) Tech 3252-E and also in the periodical Fernseh- und Kino-technik 1987, Heft ½ pages 15–22. Precautions must be taken in reproducing the recorded signals to assure that the video and audio data distributed over the four channel are correctly put back together. For that reason, in the known method each recorded data block is preceded by identification signals which specify the segment, picture field and sector, in which the particular data block is located. In addition, a synchronization signal consisting of two 8-bit words precedes data block.

Falsely read identification signals and synchronizing signals have the result, after evaluation of identification signals and synchronizing signals, that the consequent control of signal memories provided in the various reproduction channels produces substantial disturbances in the reproduction.

SUMMARY OF THE INVENTION

An object of the present invention is to provide a method of reproducing recorded television signals in which erroneously read out identification signals may be recognized and as a result, so far as possible, only error free identification signals and synchronizing signals are passed on. In the known practice, which has also become known under the designation D1-standard, there is provided some detection of errors by means of a simple checking (Hamming Code) of the identification signal that are read out, but by this system only part of the errors occurring can be recognized.

In the method of the invention the identification signals of successive data blocks are compared with each other. This has the advantage that error-free identification signals can be obtained and that reliable synchronization is produced, because by reference to predetermined characteristics of the data block recording pattern, there is sufficient redundancy in the identification signal information for detection and correction of identification signal errors in practically all cases. It is possible to use control signals from a longitudinal recorded track as another source of information for correcting misread data block identification signals.

Further details and elaborations of the method of the invention will be better understood with reference to the detailed description that follows. The invention is useful for incorporation in a system such as is disclosed in the above-referenced copending application of Jurgen Heitman, Rolf Loos and myself.

BRIEF DESCRIPTION OF THE DRAWINGS

The invention is further described by way of illustrative example with reference to the annexed drawings, in which FIG. 1 is a schematic representation of a recorded data block, and FIG. 2 is a block circuit diagram of apparatus for carrying out the method of the invention.

DESCRIPTION OF THE ILLUSTRATED EMBODIMENT

FIG. 1 schematically shows a data block of the signals read out from the magnetic tape. The data block contains altogether 134 bits. First there are two synchronizing words of 8 bits each and thereafter four identification words likewise with 8 bits each. After decoding and evaluation by the conventional error checking and correction circuits the first two identification words provide one word designating the data block number, whereas the third and fourth identification words provide another word designating the segment, picture field and sector to which the data belong.

The remainder of the data block consists of two so-called code blocks each with 64 bytes, of which 60 bytes contain video or audio data and four bytes contain check words.

The circuit block diagram of FIG. 2 shows a magnetic head 1 which generates a signal which is first prepared in a signal preparation circuit 2 which provides amplification, removal of distorting enhancement of attenuation of certain frequency ranges and also quantization both in the amplitude range and also in the frequency range, so that at the output circuit 2 suitable serial digital signals for further processing are made available. These go first to a serial-parallel converter 3. In the illustrated embodiment the serial-to-parallel conversion takes place in accordance with the known process disclosed in German Pat. No. 32 25 365. Without regard to the subdivision of the serial data stream into individual words, a serial-to-parallel conversion accordingly takes place. As a result, the correlation of the individual binary places of the 8 bit wide output signals of the serial-to-parallel converter to the binary places of the data words is strictly random. After the recognition of the synchronizing word this correlation is then changed by a multiple change-over or permuting switch in such a way that a data word will be transmitted from the output parallel conductors. Details of this operation are to be found in the above-mentioned German patent.

The parallel-converted signal thus produced is then delayed in the shift register 4 for the period of one data block, namely by 134 clock periods T. The undelayed signal is supplied to a synchronization detector 5, which in a known way shows when the synchronization signal corresponds to the prescribed. synchronization signal. In accordance with the system of the above-identified patent, the synchronization detector 56 provides synchronizing information SI which indicates by how many clock periods the currently provided serial-to-parallel conversion differs from the correct correlation of the individual binary places to the data words. This synchronization information SI requires a width of 3 bits. In addition, a synchronization signal S is provided by the synchronization detector which indicates the beginning of a data block. Both of these outputs are delayed by the period of a data block in a shift register 6. The delayed and undelayed signals are compared with each other in a comparator 7. Since the synchronizing words preceding the data block do not change from data block to data block, a positive comparison result—by which is meant that the compared signals are the same—, signifies that the synchronization word was correctly recognized with high reliability. The output of the comparator 7 then causes the synchronization information SI to be loaded into a register 8. Then, in accordance with this synchronizing information, two multiple permutation switch devices 9 and 10 are so controlled that the correct correlation of the binary places to the data words is provided at their outputs.

A block start designating signal SB is produced by the synchronizing signal S as follows: Both the delayed and the undelayed synchronizing signals are supplied to an OR circuit 11, the output of which is connected with one input of an AND circuit 12. The output of the comparator 7, in response to the equality of the signals supplied to it controls a controllable switch 13 in such a way that the delayed synchronizing signal is supplied to a "fly wheel circuit" 14, which consists essentially of a counter which is reset every time it reaches the count 134 and is also reset by the delayed synchronizing signal. One output of the fly wheel circuit 14 is connected with the other input of the AND circuit 12, the output of which is connected to the output 15 for the block start signal SB shown in at the lower right hand corner of FIG. 2. The circuit has the effect that when the synchronizing signal drops out or fails to be recognized, a signal provided by the fly wheel circuit 14 will serve as a block start signal. Furthermore, this circuit prevents false signals recognized as a synchronizing word from producing a block start signal SB.

The remaining portions of the circuit of FIG. 2 serve to provide, so far as possible, error free derivation of signals which designate the picture field, segment and sector to which a data block belongs as well as reliable derivation of each data block number.

For that purpose the output signals of the multiple permutation switches 9 and 10 are respectively supplied to identification signal decoders 16 and 17. The serial-to-parallel converted data can also be obtained from the output 18 or further processing. By means of the identification signal decoders 16 and 17 the identification signals of the delayed and undelayed parallel data streams are separated from the streams and decoded in a manner corresponding to the above-described standard recommended by the EBU. The output signals of the decoder 16 and 17 contain in each case two 8 bit wide data words, of which one is the number of the particular data block and the other contains information regarding the segment, the picture field and the sector. Both words together are designated in what follows as decoded identification signals. For comparison of the delayed and undelayed decoded identification signals, a comparator 18 is provided. Since the data block number rises by 1 from data block to data block, the data block number of the delayed decoded identification signal is raised by 1 before being supplied to the comparator 18. If the two inputs of the comparator are the same, the delayed decoded identification signal, namely, the one of the previous data block, is written into a register 19. For that purpose, a pulse is supplied to the register 19 that on the one hand depends upon the output voltage of the comparator 18 and on the other hand has a phase position which corresponds to the segment, picture field and sector information output from the decoder 17. For generating this pulse an AND circuit 20 is provided to which the output of the comparator 18 and also a synchronization pulse delayed by means of the circuit 21 are supplied. At the output 22 there is accordingly available that part of the decoded identification signal which incorporates the information concerning the segment, the picture field and the sector to which the particular data block belongs.

In the case of equality between the signals supplied to the comparator 18, a counter 23 is set to the data block number of the previous data block. For that purpose the output signal of the comparator 18 is supplied through the AND circuit 24 to the load input of the counter 23. By correlation with the synchronizing pulse provided from the fly wheel circuit the result is obtained that the signals present at the data input D at that time are loaded into the counter when the decoder 17 provides the data block number. The output of the counter 23 is connected with an output 25 at which the signals corresponding to the data block number can be obtained.

If all the identification signals are read without error, then for each data block, the decoded identification signal will be found equal to the decoded delayed identification signal raised by 1. The counter 23 will accordingly be set to the data block number provided by the decoder 17 on the occurrence of each synchronizing signal so that these data block numbers will be provided at the output 25.

If, however, one of the identification signals is falsely read, no load pulse will be supplied to the counter, so that the data block number provided at the output 25 will be raised by 1 by the further operation of the counter 23 in response to the pulse SB. As soon as further identification signals are read at the beginning of a data block for which the data block number is higher by one than that of the previous data block, the counter will be again set to the actual data block number read from the tape.

Although the invention has been described with reference to a particular illustrative embodiment, it will be understood that modifications and variations are possible within the inventive concept. Thus, for example, for a further increase in reliability, the identification signals read from the magnetic tape may be compared with other signals taking into account of the geometrical pattern of the recorded tracks on the tape. Since two or three magnetic heads are at all times in contact with the magnetic tape, two or three identification signals, read at the same time from the magnetic tape can be compared with each other. Any one of these readouts which, on the basis of the track pattern, does not fit with the others can be corrected, for example by replacement with the identification signal of the previous data block. Similarly, the relative position of the head wheel to the magnetic tape or to the control pulses recorded on a longitudinal track on the tape can be brought into use for checking and correcting the identification signals.

What is claimed is:

1. Method of reproducing data recorded in oblique tracks on a magnetic tape by means of a plurality of magnetic heads mounted on a head-wheel, when the data is recorded in blocks each preceded by synchronizing and identification signals, comprising the steps of:
    delaying the identification signal of a preceding block,
    comparing the undelayed identification signal of a block being read from the tap with the delayed identification signal of said preceding block to provide a comparison result signal which is either a consistency-indicating signal or an inconsistency-indicating signal;
    in the event of obtaining a consistency-indicating result signal, accepting the undelayed identification signal as valid, and
    in the event of obtaining an inconsistency-indicating result signal, producing a provisionally acceptable identification signal by incrementing a portion of the delayed identification signal of said preceding block.

2. Method according to claim 1, wherein said delayed identification signal is delayed for comparison purposes for the period of a data block, wherein the delayed and undelayed identification signals are identification signals of successive blocks and are decoded respectively in decoders and wherein the comparing of identification signals is performed by comparing decoded identification signals respectively produced by said decoders.

3. Method according to claim 2, wherein the identification signal for each block of data include a block number and further information identifying segment, picture field and sector, wherein the data block number of the decoded delayed identification signal is incremented by 1 prior to comparing decoded identification signals respectively produced by the decoders for the delayed and undelayed signals and wherein said incremented delayed identification signal is provided as said provisionally acceptable identification signal.

4. Method according to claim 3 in which, when the comparing step shows the equality of the block number of the decoded undelayed identification signal and the incremented block number of the decoded delayed identification signal, said further information is written into a register.

5. Method according to claim 3, wherein a counter is used to assist the comparison of block numbers, wherein said counter is reset by a synchronization signal in the event of a comparison result showing equality of a decoded block number of an undelayed identification signal and an incremented decoded block number of a delayed identification signal, and said counter is then reset to an initial value corresponding to the data block number of said decoded delayed identification signal.

6. Method according to claim 1, wherein synchronization information is provided by a synchronization detector and is delayed for the period of a data block and wherein undelayed synchronization information from said synchronization detector is compared with said delayed synchronization information and a resulting signal is then written into a register when there is coincidence of delayed and undelayed synchronization information.

7. Method according to claim 6, wherein a serial signal read out from a magnetic head is first subjected to serial-to-parallel conversion without word synchronization to produce an undelayed parallel signal, after which the undelayed parallel signal is delayed by the period of a data block, the undelayed parallel signal is supplied to a synchronization detector and the undelayed and the delayed parallel signals are supplied in successive pairs to a multiple permuting switching device, wherein synchronization information is generated from said synchronization detector to which said undelayed parallel signal is supplied and which in response shows by how many clock periods the serial-to-parallel conversion of the serial signals lies from a word-synchronous serial-to-parallel conversion, and wherein said synchronization information thus obtained is stored in a register for control of said multiple permuting switching device for providing word-synchronous-parallel signals.

8. Method according to claim 7, wherein a synchronizing signal for recognition of the beginning of a data block is derived from said synchronization detector and is delayed for the period of a data block and compared with the undelayed synchronization signal for recognition of the beginning of a data block, and wherein a comparison result showing coincidence of delayed and undelayed signals is supplied to a fly wheel circuit and a block start signal is derived by AND correlation of an output signal of said fly wheel circuit with the output of an OR correlation of said synchronization signals and said delayed synchronization signal recognizing the beginning of a data block.

9. Method according to claim 1, wherein each of said plurality of magnetic heads on said head wheel reads a sector which is different from any sector being read at the same time by another magnetic head and wherein identification signals of a plurality of sectors are compared with each other and those identification signals which are inconsistent with identification signals of other sectors are corrected with reference to a predetermined track and recording pattern which was used in the recording of the signals read by said magnetic heads.

* * * * *